(12) United States Patent
Kojima et al.

(10) Patent No.: US 11,047,400 B2
(45) Date of Patent: Jun. 29, 2021

(54) FLUID PRESSURE CONTROL DEVICE

(71) Applicant: KYB Corporation, Tokyo (JP)

(72) Inventors: Masanari Kojima, Kanagawa (JP);
Masayuki Nakamura, Kanagawa (JP);
Takeshi Terao, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 16/622,981

(22) PCT Filed: Sep. 28, 2018

(86) PCT No.: PCT/JP2018/036401
§ 371 (c)(1),
(2) Date: Dec. 16, 2019

(87) PCT Pub. No.: WO2019/138609
PCT Pub. Date: Jul. 18, 2019

(65) Prior Publication Data
US 2020/0116168 A1  Apr. 16, 2020

(30) Foreign Application Priority Data
Jan. 12, 2018  (JP) .............................. JP2018-003773

(51) Int. Cl.
*F15B 11/08* (2006.01)
*E02F 9/22* (2006.01)
(Continued)

(52) U.S. Cl.
CPC ............... *F15B 11/08* (2013.01); *B66F 9/22* (2013.01); *E02F 9/2267* (2013.01); *E02F 9/2285* (2013.01); *F15B 2211/20576* (2013.01); *F15B 2211/329* (2013.01); *F15B 2211/355* (2013.01); *F15B 2211/50518* (2013.01); *F15B 2211/6355* (2013.01); *F16K 11/07* (2013.01)

(58) Field of Classification Search
CPC ..... Y10T 137/86582; Y10T 137/87193; F15B 11/08; F15B 2211/20576; F15B 2211/329; F15B 2211/355; F15B 2211/50518; F15B 2211/6355; B66F 9/22; E02F 9/2267; E02F 9/2285; F16K 11/07
See application file for complete search history.

(56) References Cited

U.S. PATENT DOCUMENTS

| 4,259,986 A | * | 4/1981 | Maucher | ............... | F15B 13/015 |
|---|---|---|---|---|---|
| | | | | | 137/596.12 |
| 4,729,222 A | * | 3/1988 | Tanaka | .................... | E02F 9/123 |
| | | | | | 60/436 |

(Continued)

FOREIGN PATENT DOCUMENTS

| JP | 2006-298519 A | 11/2006 |
|---|---|---|
| JP | 2009019660 A | * 1/2009 |
| JP | 2010111344 A | * 5/2010 |

*Primary Examiner* — Jessica Cahill
(74) *Attorney, Agent, or Firm* — Rabin & Berdo, P.C.

(57) ABSTRACT

A fluid pressure control device includes a switching valve, a main pilot passage and a sub pilot passage, the switching valve is configured to be switched to the open position when the working fluid is supplied to the pilot chamber, and to be switched to the throttled position with opening on the downstream side of the switching valve in the neutral passage, and the sub pilot passage is provided with a throttle portion and a check valve in parallel in the throttle portion.

4 Claims, 6 Drawing Sheets

(51) Int. Cl.
*F16K 11/07* (2006.01)
*B66F 9/22* (2006.01)

(56) References Cited

U.S. PATENT DOCUMENTS

| | | | | |
|---|---|---|---|---|
| 5,077,972 A * | 1/1992 | Bianchetta | ............ | E02F 9/2225 |
| | | | | 60/427 |
| 7,222,484 B1 * | 5/2007 | Dornbach | ................. | B66F 9/22 |
| | | | | 60/422 |
| 7,614,225 B2 * | 11/2009 | Kim | ..................... | B62D 11/005 |
| | | | | 60/421 |
| 9,458,840 B2 * | 10/2016 | Azuma | ..................... | F04B 7/00 |
| 10,578,132 B2 * | 3/2020 | Terao | ..................... | F15B 13/06 |
| 2003/0121184 A1 * | 7/2003 | Yoshino | ................ | F15B 11/024 |
| | | | | 37/348 |
| 2004/0031173 A1 * | 2/2004 | Yoshino | ................ | E02F 9/2282 |
| | | | | 37/348 |
| 2004/0035103 A1 * | 2/2004 | Nagura | .................. | F15B 11/17 |
| | | | | 60/414 |
| 2005/0178116 A1 * | 8/2005 | Olbrich | ................ | F15B 11/165 |
| | | | | 60/420 |

* cited by examiner

FLUID PRESSURE CONTROL DEVICE

TECHNICAL FIELD

The present invention relates to a fluid pressure control device.

BACKGROUND ART

JP2006-298519A discloses a load control system of a forklift. This load control system includes a hydraulic circuit configured to control operations of a lift cylinder and a tilt cylinder.

SUMMARY OF INVENTION

The load control system (fluid pressure control device) disclosed in JP2006-298519A includes a lift flowrate control valve that controls the operation of the lift cylinder and a tilt flowrate control valve that controls the operation of the tilt cylinder. The lift flowrate control valve and the tilt flowrate control valve are provided in order from an upstream side (pump side) in a neutral passage which leads a working oil discharged from the pump to a tank. The neutral passage is connected to the pump through a check valve.

Each of the lift flowrate control valve and the tilt flowrate control valve has a pair of pilot chambers. A pressure of the working oil is led to the pilot chambers through a pilot passage branching from between the pump and the check valve in the neutral passage. A pilot pressure is reduced by a proportional solenoid type pressure reduction valve by pressure according to an operation amount of an operation lever, and positions of the lift flowrate control valve and the tilt flowrate control valve are switched by the reduced pilot pressure.

In this fluid pressure control device, the check valve is provided between the lift flowrate control valve and the pump. Thus, even if a flow of the working oil in the neutral passage is allowed and the pressure in the neutral passage lowers to a tank pressure, the pilot pressure is generated in the passage between the pump and the check valve by channel resistance caused by a valve opening pressure of the check valve.

Moreover, in this fluid pressure control device, the lift flowrate control valve is operated to open the neutral passage in contracting the lift cylinder. In extending/contracting the tilt cylinder, the tilt flowrate control valve is operated to shut off the neutral passage. Thus, in a state where the lift cylinder is contracted and the tilt cylinder is extended or contracted, the pressure on the upstream side of the tilt flowrate control valve in the neutral passage rises and thus, the pressure according to the pressure in the neutral passage is led to the pilot passage.

However, if the tilt flowrate control valve is returned to a neutral position so that only the lift cylinder is contracted in this state, the neutral passage having been shut off by the tilt flowrate control valve is opened, and the pressure in the neutral passage is rapidly lowered. If such rapid pressure lowering occurs, there is a concern that the pressure in the pilot passage on the upstream side of the check valve is also lowered depending on a delay of the operation of the check valve. If the pressure in the pilot passage is lowered as above, the position of the lift flowrate control valve is switched unintentionally, and there is a concern that the operation of the lift cylinder becomes unstable.

The present invention has an object to improve stability of the operation of the fluid pressure control device.

According to one aspect of the present invention, a fluid pressure control device includes a neutral passage connecting a pump and a tank, a first control valve provided in the neutral passage and configured to control an operation of a first actuator by being operated by a working fluid led to a pair of first pilot chambers, a second control valve provided in the neutral passage and configured to control an operation of a second actuator, a switching valve provided on an upstream side of the first control valve and the second control valve in the neutral passage, the switching valve being configured to have a position switched by the working fluid led to a pilot chamber, a main pilot passage connected to an upstream side of the switching valve in the neutral passage, the main pilot passage being configured to lead the working fluid in the neutral passage to the pair of first pilot chambers, and a sub pilot passage connected to the upstream side of the switching valve in the neutral passage, the sub pilot passage being configured to lead the working fluid in the neutral passage to the pilot chamber, wherein, the first control valve has a first neutral position where supply/discharge of the working fluid to/from the first actuator is shut off and the neutral passage is opened, a supply position switched from the first neutral position by one of pressures in the pair of first pilot chambers and where the neutral passage is shut off and the working fluid discharged from the pump is led to the first actuator; and, a discharge position switched from the first neutral position by the other pressure of the pair of first pilot chambers and where the neutral passage is opened and the working fluid is led to the tank from the first actuator, the second control valve has, a second neutral position where the supply/discharge of the working fluid to/from the second actuator is shut off and the neutral passage is opened, and an operation position where the neutral passage is shut off and the working fluid discharged from the pump is led to the second actuator, the switching valve has an open position where the neutral passage is opened and a throttled position where a flow of the working fluid in the neutral passage is throttled, and is configured to be switched to the open position when the working fluid is supplied to the pilot chamber from the neutral passage through the sub pilot passage with the shut-off on a downstream side of the switching valve in the neutral passage, and to be switched to the throttled position with opening on the downstream side of the switching valve in the neutral passage, and the sub pilot passage is provided with a throttle portion configured to throttle the flow of the working fluid and a check valve in parallel in the throttle portion, the check valve being configured to shut off the flow of the working fluid supplied to the pilot chamber and to allow the flow of the working fluid discharged from the pilot chamber.

DESCRIPTION OF EMBODIMENTS

Hereinafter, a fluid pressure control device 100 of an embodiment of the present invention will be described by referring to the attached drawings. The fluid pressure control device 100 is used for a fluid pressure control system 1000 of a forklift.

Figure 1:
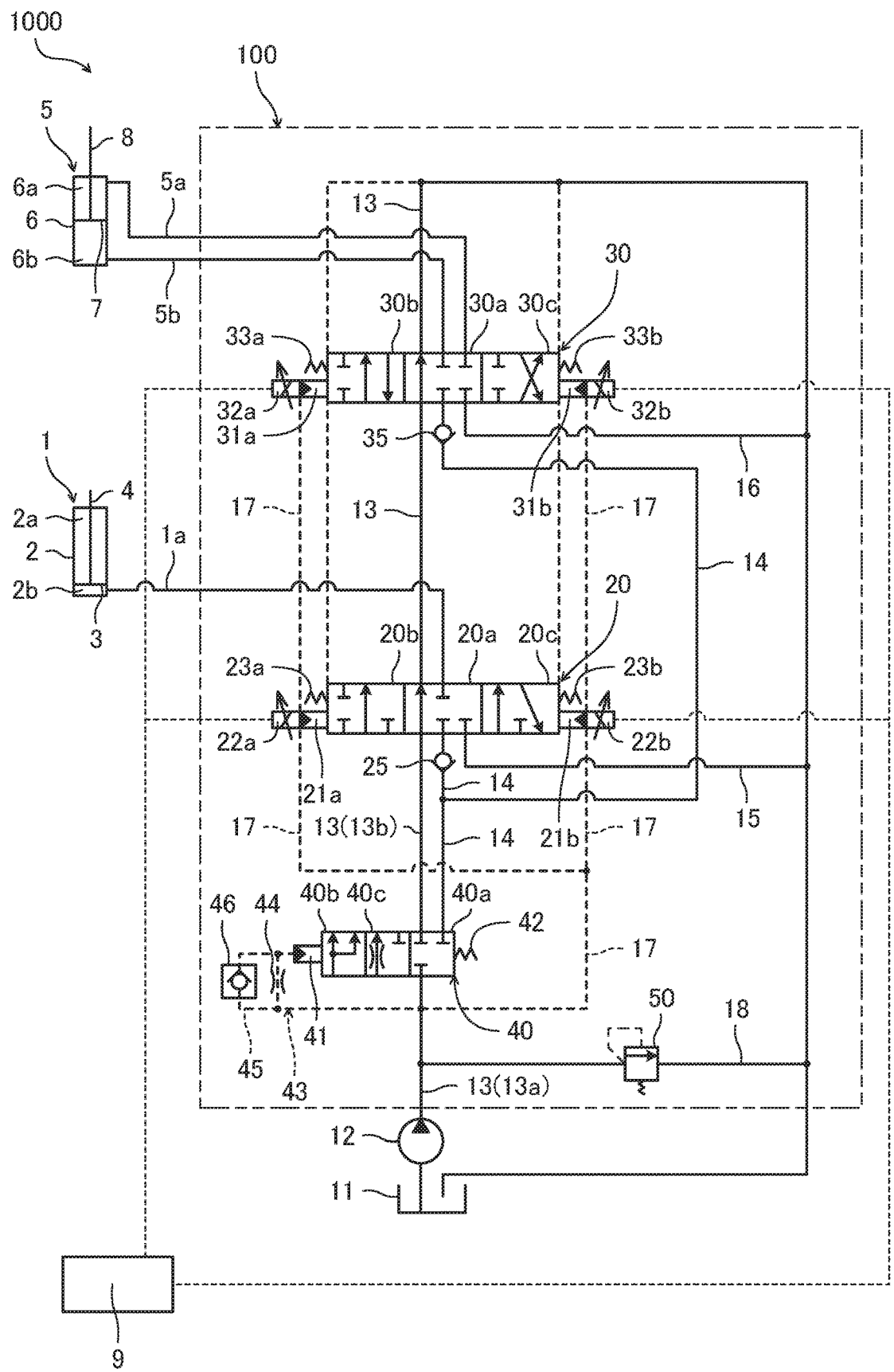
FIG. 1 is a circuit diagram of a fluid pressure control device according to an embodiment of the present invention.

As illustrated in FIG. 1, the fluid pressure control system 1000 includes a tank 11 that stores a working oil serving as a working fluid, a pump 12 that pumps up the working oil from the tank 11 and to discharge the working oil, a lift cylinder 1 servings as a first actuator, a tilt cylinder 5 serving as a second actuator, and the fluid pressure control device 100 that controls operations of the lift cylinder 1 and the tilt cylinder 5. The lift cylinder 1 elevates a fork (not shown) of a forklift up/down, and the tilt cylinder 5 changes a tilt angle of a mast (not shown) of the forklift.

Though not shown, the fluid pressure control system 1000 may include an actuator, which is for example a fork positioner that adjusts an interval between the forks, serving as the second actuator other than the lift cylinder 1 and the tilt cylinder 5. An operation of such actuator may be controlled by the fluid pressure control device 100.

The pump 12 is driven by a driving source (not shown) such as an engine and a motor. A neutral passage 13 is connected to an outlet of the pump 12, and the working oil that is discharged from the pump 12 flows into the neutral passage 13. The neutral passage 13 is connected to the tank 11, and in a state where a flow of the working oil in the neutral passage 13 is not shut off, the working oil that is discharged from the pump 12 is discharged to the tank 11 through the neutral passage 13.

The lift cylinder 1 is a single-acting type hydraulic cylinder having a piston 3 that defines an inside of a cylinder tube 2 into a rod side chamber 2a and an anti-rod side chamber 2b. A piston rod 4 is connected to the piston 3. The rod side chamber 2a is opened to the atmosphere, while the anti-rod side chamber 2b is connected to the fluid pressure control device 100 through a main passage 1a. The rod side chamber 2a is not limited to a form opened to the atmosphere but may be connected to the tank 11 through a drain passage, for example.

When the working oil is supplied from the fluid pressure control device 100 to the anti-rod side chamber 2b, the lift cylinder 1 is extended and raises the fork. When the working oil is discharged from the anti-rod side chamber 2b by the weight of the fork, piston rod 4, and the piston 3, the lift cylinder 1 is contracted and lowers the fork.

The tilt cylinder 5 is a double-acting hydraulic cylinder having a piston 7 that defines the inside of the cylinder tube 6 into a rod side chamber 6a and an anti-rod side chamber 6b. A piston rod 8 is connected to the piston 7. The rod side chamber 6a is connected to the fluid pressure control device 100 through a first main passage 5a, and the anti-rod side chamber 6b is connected to the fluid pressure control device 100 through a second main passage 5b.

When the working oil is supplied from the fluid pressure control device 100 to the rod side chamber 6a, and the working oil is discharged from the anti-rod side chamber 6b, the tilt cylinder 5 is contracted and tilts the mast rearward. When the working oil is supplied from the fluid pressure control device 100 to the anti-rod side chamber 6b, and the working oil is discharged from the rod side chamber 6a, the tilt cylinder 5 is extended and tilts the mast forward.

The fluid pressure control device 100 includes a first control valve 20 that controls the flow of the working oil supplied to/discharged from the lift cylinder 1, a second control valve 30 that controls the flow of the working oil supplied to/discharged from the tilt cylinder 5, and a switching valve 40 that controls the flow of the working oil in the neutral passage 13. The first control valve 20 is provided in the neutral passage 13, the second control valve 30 is provided on a downstream side of the first control valve 20 in the neutral passage 13, and the switching valve 40 is provided on an upstream side of the first control valve 20 in the neutral passage 13.

A relief passage 18 branching from the neutral passage 13 is connected to the upstream side of the switching valve 40 in the neutral passage 13, and a relief valve 50 is provided in the relief passage 18. The pressure in the neutral passage 13 is kept at a set pressure or less of the relief valve 50 by the relief valve 50.

The first control valve 20 is connected to a supply passage 14 that communicates with the neutral passage 13 through the switching valve 40 and to which the working oil from the pump 12 is supplied in accordance with an operation of the switching valve 40 and is connected to the tank 11 through a return passage 15 and the neutral passage 13. Similarly, the second control valve 30 is connected to the supply passage 14 and is connected to the tank 11 through a return passage 16 and the neutral passage 13. Check valves 25 and 35 that allows only the flow of the working oil to the first control valve 20 and the second control valve 30 from the pump 12 are provided in the supply passage 14. The return passages 15 and 16 are connected to the tank 11 through the neutral passage 13 but may be directly connected to the tank 11 without pathing through the neutral passage 13.

The first control valve 20 has a neutral position 20a serving as a first neutral position, a supply position 20b, and a discharge position 20c. At the neutral position 20a, the first control valve 20 shuts off supply/discharge of the working oil to/from the anti-rod side chamber 2b of the lift cylinder 1 and opens the neutral passage 13. At the supply position 20b, the first control valve 20 shuts off the neutral passage 13 and leads the working oil discharged from the pump 12 to the anti-rod side chamber 2b through the main passage 1a. At the discharge position 20c, the first control valve 20 opens the neutral passage 13 and leads the working oil discharged from the anti-rod side chamber 2b to the tank 11 through the return passage 15.

Moreover, the first control valve 20 has pilot chambers 21a and 21b serving as a pair of first pilot chambers, proportional solenoid-type solenoid valves 22a and 22b that controls the pressure in the pilot chambers 21a and 21b, and centering springs 23a and 23b. The pilot chambers 21a and 21b are selectively connected to a pilot passage 17 serving as a main pilot passage or the tank 11 by the solenoid valves 22a and 22b, and the pressure in the pilot chambers 21a and 21b is raised by the working oil led through the pilot passage 17.

The solenoid valves 22a and 22b are electrically connected to a controller 9. The controller 9 outputs an electric current in accordance with an operation of an operation lever (not shown) by a worker. When the electric current from the controller 9 is supplied to the solenoid valves 22a and 22b, the solenoid valves 22a and 22b reduce the pilot pressure and supply the pilot pressure to the pilot chambers 21a and 21b. In a state where the electric current is not supplied to the solenoid valves 22a and 22b, the solenoid valves 22a and 22b shut off the supply of the pilot pressure to the pilot chambers 21a and 21b and connect the pilot chambers 21a and 21b to the tank 11.

An operation of the first control valve 20 with the operations of the solenoid valves 22a and 22b will be described.

When the electric current is supplied to the solenoid valve 22a from the controller 9, the solenoid valve 22a shuts off connection between the one pilot chamber 21a and the tank 11 and leads the pressure of the working oil, which is led from the pilot passage 17, to the one pilot chamber 21a. As a result, the pressure in the one pilot chamber 21a becomes higher than the pressure in the other pilot chamber 21b, and the first control valve 20 is switched to the supply position 20b from the neutral position 20a against a biasing force of the centering spring 23b.

Similarly, when the electric current is supplied to the solenoid valve 22b from the controller 9, the solenoid valve 22b shuts off connection between the other pilot chamber 21b and the tank 11 and leads the pressure of the working oil, which is led from the pilot passage 17, to the other pilot chamber 21b. As a result, the pressure in the other pilot chamber 21b becomes higher than the pressure in the one pilot chamber 21a, and the first control valve 20 is switched to the discharge position 20c from the neutral position 20a against a biasing force of the centering spring 23a.

In a state where the electric current is not supplied from the controller 9 to either of the solenoid valves 22a and 22b, the supply of the working oil to the pilot chambers 21a and 21b is shut off. At this time, the pilot chambers 21a and 21b are connected to the tank 11, and the pressure in the pilot chambers 21a and 21b becomes substantially the same as the pressure in the tank 11. As a result, the first control valve 20 is held at the neutral position 20a by the biasing forces of the centering springs 23a and 23b.

The second control valve 30 has a neutral position 30a serving as a second neutral position and operation positions 30b and 30c. At the neutral position 30a, the second control valve 30 shuts off supply/discharge of the working oil to/from the rod side chamber 6a and the anti-rod side chamber 6b of the tilt cylinder 5 and opens the neutral passage 13. At the operation position 30b, the second control valve 30 shuts off the neutral passage 13 and leads the working oil discharged from the pump 12 to the anti-rod side chamber 6b through the second main passage 5b and leads the working oil discharged from the rod side chamber 6a to the tank 11 through the return passage 16. At the operation position 30c, the second control valve 30 shuts off the neutral passage 13 and leads the working oil discharged from the pump 12 to the rod side chamber 6a through the first main passage 5a and leads the working oil discharged from the anti-rod side chamber 6b to the tank 11 through the return passage 16.

Moreover, the second control valve 30 has, similarly to the first control valve 20, pilot chambers 31a and 31b serving as a pair of second pilot chambers, proportional solenoid-type solenoid valves 32a and 32b that controls the pressure in the pilot chambers 31a and 31b, and centering springs 33a and 33b. The pilot chambers 31a and 31b are selectively connected to a pilot passage 17 or the tank 11 by the solenoid valves 32a and 32b.

Since the operation of the second control valve 30 is substantially the same as the operation the first control valve 20, the description will be omitted here.

The switching valve 40 has a shut-off position 40a where the flow of the working oil in the neutral passage 13 is shut off, an open position 40b where the neutral passage 13 is opened, and a throttle position 40c where the flow of the working oil in the neutral passage 13 is throttled. The switching valve 40 is connected to the first control valve 20 and the second control valve 30 through the supply passage 14. At the open position 40b, the switching valve 40 connects the neutral passage 13 and the supply passage 14 to each other.

Moreover, the switching valve 40 has a pilot chamber 41 and a spring 42. A pilot passage 43 serving as a sub pilot passage is connected to the pilot chamber 41, and the pressure in the pilot chamber 41 is controlled in accordance with the working oil led through the pilot passage 43.

When the pressure in the pilot chamber 41 becomes smaller than the biasing force of the spring 42, or substantially equal to the pressure in the tank 11, for example, the switching valve 40 is held at the shut-off position 40a by the biasing force of the spring 42. When the pressure in the pilot chamber 41 rises, the switching valve 40 is switched to the throttle position 40c against the biasing force of the spring 42. When the pressure in the pilot chamber 41 further rises, the switching valve 40 is switched to the open position 40b against the biasing force of the spring 42.

In the following, the upstream side of the switching valve 40 in the neutral passage 13 is also called an "upstream-side neutral passage 13a" and the downstream side of the switching valve 40 in the neutral passage 13 is also called a "downstream-side neutral passage 13b".

The pilot passage 17 is connected to the upstream-side neutral passage 13a and leads the working oil in the upstream-side neutral passage 13a to the pilot chambers 21a, 21b, 31a, and 31b. The pilot passage 43 is connected to the upstream-side neutral passage 13a and leads the working oil in the upstream-side neutral passage 13a to the pilot chamber 41. That is, the first control valve 20, the second control valve 30, and the switching valve 40 are operated by the working oil led from the upstream-side neutral passage 13a.

A throttle portion 44 that throttles the flow of the working oil is provided in the pilot passage 43. The flow of the working oil in the pilot passage 43 is limited by the throttle portion 44. Therefore, a rapid rise of the pressure in the pilot chamber 41 can be prevented, and an impact when the switching valve 40 is switched from the shut-off position 40a to the throttle position 40c or from the throttle position 40c to the open position 40b can be relaxed.

Moreover, a check valve 46 is provided in parallel with the throttle portion 44 in the pilot passage 43. Specifically, the pilot passage 43 has a bypass passage 45 bypassing the throttle portion 44, and the check valve 46 is provided in the bypass passage 45. The check valve 46 shuts off the flow of the working oil from the upstream-side neutral passage 13a to the pilot chamber 41 and allows the flow of the working oil from the pilot chamber 41 to the upstream-side neutral passage 13a.

Since the check valve 46 is provided in parallel with the throttle portion 44, when the pressure in the upstream-side neutral passage 13a rises, the working oil is supplied from the upstream-side neutral passage 13a to the pilot chamber 41 through the throttle portion 44. When the pressure in the upstream-side neutral passage 13a lowers, and the switching valve 40 is biased by the spring 42, the working oil is discharged from the pilot chamber 41 to the upstream-side neutral passage 13a through the check valve 46. Therefore, when the pressure in the upstream-side neutral passage 13a lowers in a state where the switching valve 40 is switched to the open position 40b, the switching valve 40 is rapidly switched to the throttle position 40c as compared with a case where the check valve 46 is not provided.

Subsequently, an operation of the fluid pressure control device 100 will be described by referring to FIG. 1.

First, startup of the fluid pressure control device 100 will be described.

In a state where the pump 12 is stopped, the working oil is not supplied to the pilot passage 17 and the pilot passage 43. Thus, the first control valve 20 is held at the neutral position 20*a* by the centering springs 23*a* and 23*b*. Similarly, the second control valve 30 is held at the neutral position 30*a* by the centering springs 33*a* and 33*b*. The switching valve 40 is held at the shut-off position 40*a* by the spring 42.

When the pump 12 is driven, the pressure in the upstream-side neutral passage 13*a* rises by the working oil discharged from the pump 12, and the pressure in the pilot passage 17 rises. Thus, the first control valve 20 and the second control valve 30 are operated by the pressure in the pilot passage 17 in accordance with switching of the solenoid valves 22*a*, 22*b*, 32*a*, and 32*b*.

In the fluid pressure control device 100, in the state where the pump 12 is stopped, the switching valve 40 is held at the shut-off position 40*a*. Thus, when the pump 12 starts to be driven, the neutral passage 13 is shut off, and the pressure in the upstream-side neutral passage 13*a* and the pilot passage 17 rises.

With the driving of the pump 12, the working oil is led to the pilot chamber 41 through the pilot passage 43, and the pressure in the pilot chamber 41 rises. As a result, the switching valve 40 is switched to the throttle position 40*c*, and the pressure in the upstream-side neutral passage 13*a* is maintained at a pressure higher than the pressure in the tank 11.

As described above, in the fluid pressure control device 100, since the pilot chamber 41 of the switching valve 40 is connected to the neutral passage 13 through the pilot passage 43, the position of the switching valve 40 can be switched in accordance with the driving of the pump 12.

Subsequently, a case where only the first control valve 20 is operated will be described.

When the electric current is supplied to the solenoid valve 22*a* of the first control valve 20 from the controller 9 so as to switch the first control valve 20 to the supply position 20*b*, the neutral passage 13 is shut off by the first control valve 20. Since the pressure in the upstream-side neutral passage 13*a* further rises by the shut-off of the neutral passage 13, the switching valve 40 is switched to the open position 40*b*. As a result, the upstream-side neutral passage 13*a* and the supply passage 14 are connected.

When the first control valve 20 is switched to the supply position 20*b* in the state where the switching valve 40 is switched to the open position 40*b*, the working oil that is discharged from the pump 12 is led to the anti-rod side chamber 2*b* of the lift cylinder 1 through the supply passage 14, the first control valve 20, and the main passage 1*a*. As a result, the lift cylinder 1 is extended, and the fork is raised.

When the supply of the electric current to the solenoid valve 22*a* of the first control valve 20 is shut off, the first control valve 20 is switched to the neutral position 20*a*. As a result, the operation of the lift cylinder 1 is stopped.

When the electric current is supplied to the solenoid valve 22*b* of the first control valve 20 from the controller 9 so as to switch the first control valve 20 to the discharge position 20*c*, the working oil in the anti-rod side chamber 2*b* of the lift cylinder 1 is discharged to the tank 11 through the main passage 1*a*, the first control valve 20, and the return passage 15 by the weights of the fork, the piston rod 4, and the piston 3. As a result, the lift cylinder 1 is contracted, and the forks are lowered.

When the first control valve 20 is at the discharge position 20*c* and the neutral position 20*a*, the switching valve 40 has been switched to the throttle position 40*c*.

The first control valve 20 opens the neutral passage 13 both at the discharge position 20*c* and the neutral position 20*a*. Thus, when the first control valve 20 is switched between the discharge position 20*c* and the neutral position 20*a*, the pressure in the neutral passage 13 is maintained, and the switching valve 40 is held at the throttle position 40*c*.

Subsequently, a case where both the first control valve 20 and the second control valve 30 are operated will be described.

When the first control valve 20 is switched to the discharge position 20*c* and the second control valve 30 is switched to the operation position 30*c*, the neutral passage 13 is shut off by the second control valve 30. The pressure in the upstream-side neutral position 13*a* is raised by the shut-off of the neutral passage 13, and the switching valve 40 is switched to the open position 40*b*. As a result, the upstream-side neutral passage 13*a* and the supply passage 14 are connected.

Furthermore, in a state where the second control valve 30 is switched to the operation position 30*c*, the working oil that is discharged from the pump 12 is led to the rod side chamber 6*a* of the tilt cylinder 5 through the supply passage 14, the second control valve 30, and the first main passage 5*a*. At this time, the working oil in the anti-rod side chamber 6*b* of the tilt cylinder 5 is discharged to the tank 11 through the second main passage 5*b*, the second control valve 30, and the return passage 16. As a result, the tilt cylinder 5 is contracted.

When the second control valve 30 is returned to the neutral position 30*a* from the operation position 30*c* at the aforementioned simultaneous operation, the neutral passage 13 having been shut off by the second control valve 30 is opened. As a result, the pressure in the upstream-side neutral passage 13*a* is lowered, and the switching valve 40 is moved by the biasing force of the spring 42, whereby the working oil in the pilot chamber 41 of the switching valve 40 is discharged to the neutral passage 13.

At this time, the working oil in the pilot chamber 41 is discharged to the neutral passage 13 through the check valve 46. Thus, the pressure in the pilot chamber 41 is rapidly lowered as compared with the case where the working oil in the pilot chamber 41 is discharged only through the throttle portion 44, and the switching valve 40 is switched to the throttle position 40*c*.

That is, if the working oil in the pilot chamber 41 is discharged only through the throttle portion 44, the flow of the working oil that is discharged from the pilot chamber 41 of the switching valve 40 is throttled by the throttle portion 44. Thus, it takes time until the switching valve 40 reaches the throttle position 40*c*. Until the switching valve 40 reaches the throttle position 40*c*, the switching valve 40 opens the neutral passage 13, and the pressure in the pilot passage 17 lowers to the pressure in the tank 11. Thus, regardless of the electric current supplied to the solenoid valve 22*b* of the first control valve 20, the pressure in the pilot chamber 21*b* lowers, the first control valve 20 is switched to the neutral position 20*a* by the centering springs 23*a* and 23*b*. As a result, the operation of the lift cylinder 1 is instantaneously stopped, and lowering of the fork is unintentionally stopped.

As described above, if the working oil in the pilot chamber 41 is discharged only through the throttle portion 44, it takes time until the switching valve 40 is switched from the open position 40*b* to the throttle position 40*c*, and the pressure in the pilot passage 17 lowers. As a result, there is a concern that the first control valve 20 performs an unintentional operation.

In the fluid pressure control device 100 according to this embodiment (see FIG. 1 and the like), since the working oil in the pilot chamber 41 is discharged through the check valve 46, the pressure in the pilot chamber 41 rapidly lowers as compared with the case of discharge only through the throttle portion 44, and the switching valve 40 is switched to the throttle position 40c. Thus, the pressure in the upstream-side neutral passage 13a is maintained at a pressure higher than the pressure (tank pressure) in the downstream-side neutral passage 13b, and lowering of the pressure in the pilot passage 17 can be prevented, and unintentional switching of the first control valve 20 can be prevented. Therefore, stability of the operation of the fluid pressure control device 100 can be improved.

Subsequently, a structure of the switching valve 40 will be specifically described by referring to FIGS. 2 to 4.

Figure 2:
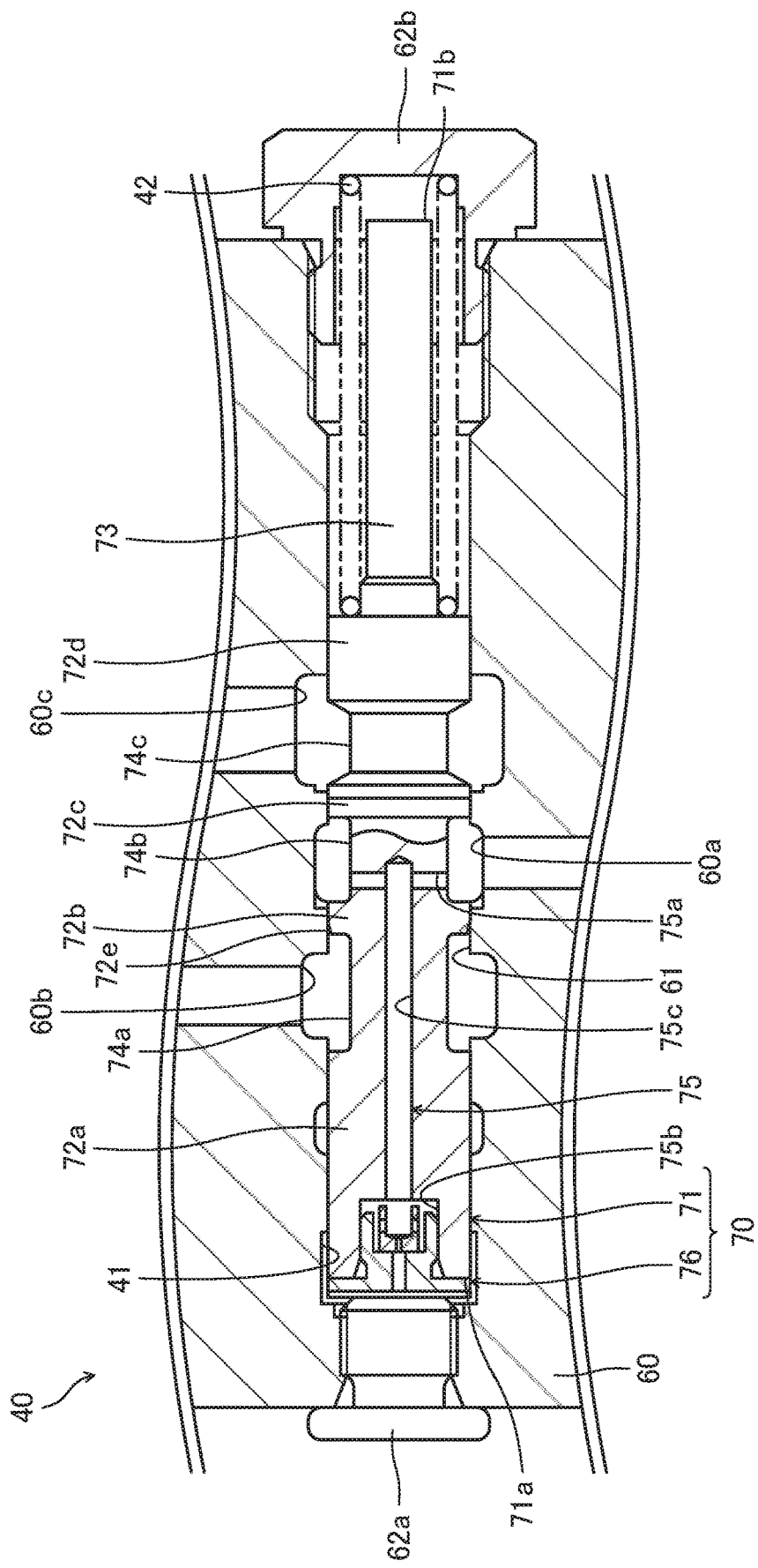
FIG. 2 is a sectional view of a switching valve and illustrates a state at a shut-off position.

FIG. 2 is a sectional view of the switching valve 40 and illustrates a state at the shut-off position 40a (see FIG. 1). As illustrated in FIG. 2, the switching valve 40 has a housing 60 having a hole 61 and a spool 70 slidably accommodated in the hole 61. One of openings of the hole 61 is closed by a plug 62a, and the other opening is closed by a plug 62b.

The spool 70 has a spool body 71 extending along a center axis of the hole 61 and a plug 76 mounted on one end portion 71a of the spool body 71. The plug 76 is faced with the plug 62a, and the other end portion 71b of the spool body 71 is faced with the plug 62b.

In the following, a direction along the spool body 71 is called an "axial direction", and a direction extending radially centered around the spool body 71 is called a "radial direction", and a direction along a circumference of the spool body 71 is called a "circumferential direction".

An upstream-side neutral port 60a serving as a neutral port connected to the upstream-side neutral passage 13a, a downstream-side neutral port 60b serving as a neutral port connected to the downstream-side neutral passage 13b, and a supply port 60c connected to the supply passage 14 are formed on an inner peripheral surface of the hole 61 of the housing 60. Moreover, the pilot chamber 41 is defined in the hole 61 by the spool 70 and the plug 62a. The plug 76 of the spool 70 is faced with the pilot chamber 41.

Since the plug 76 of the spool 70 is faced with the plug 62a, movement of the spool 70 in a direction of reducing the pilot chamber 41 is limited by the plug 62a. Since the other end surface of the spool 70 is faced with the plug 62b, the movement of the spool 70 in a direction of enlarging the pilot chamber 41 is limited by the plug 62b. That is, the plugs 62a and 62b function as limiting portions that limit the movement of the spool 70 in the directions reducing and enlarging the pilot chamber 41.

The spool body 71 has first, second, third, and fourth land portions 72a, 72b, 72c, and 72d in sliding contact with the hole 61. The first, second, third, and fourth land portions 72a, 72b, 72c, and 72d are formed from the one end portion 71a toward the other end portion 71b of the spool body 71 in this order at intervals.

A first annular groove 74a is formed between the first land portion 72a and the second land portion 72b. Similarly, a second annular groove 74b is formed between the second land portion 72b and the third land portion 72c, and a third annular groove 74c is formed between the third land portion 72c and the fourth land portion 72d. The first, second, and third annular grooves 74a, 74b, and 74c communicate with the downstream-side neutral port 60b, the upstream-side neutral port 60a, and the supply port 60c, respectively, regardless of the position of the spool 70. A part of the second land portion 72b is provided with a taper portion 72e formed so that an outer diameter becomes smaller when going toward the direction of reducing the pilot chamber 41.

The spool body 71 is provided with a small-diameter portion 73 formed so as to protrude in the axial direction from the fourth land portion 72d. The small-diameter portion 73 is inserted into a coil spring serving as the spring 42 accommodated in the hole 61 of the housing 60. The spring 42 is provided in a state compressed between the plug 62b and the fourth land portion 72d and biases the spool 70 in the direction of reducing the pilot chamber 41.

At the shut-off position 40a illustrated in FIG. 2, the plug 76 of the spool 70 is in contact with the plug 62a, and the pilot chamber 41 is in the most reduced state. At this time, communication between the upstream-side neutral port 60a and the downstream-side neutral port 60b is shut off by the second land portion 72b, and the communication between the upstream-side neutral port 60a and the supply port 60c is shut off by the third land portion 72c.

When the pressure in the pilot chamber 41 rises, the spool 70 is moved to the direction of enlarging the pilot chamber 41 against the biasing force of the spring 42. Since the taper portion 72e is formed on a part of the second land portion 72b, the upstream-side neutral port 60a and the downstream-side neutral port 60b communicate with each other through a space between an outer peripheral surface of the taper portion 72e and an inner peripheral surface of the hole 61 with the movement of the spool 70, and the flow of the working oil in the neutral passage 13 (see FIG. 1) is allowed. At this time, the flow of the working oil in the neutral passage 13 is throttled by the taper portion 72e of the second land portion 72b. Moreover, at this time, the communication between the upstream-side neutral port 60a and the supply port 60c is shut off by the third land portion 72c.

If the pressure in the pilot chamber 41 further rises, the spool 70 is further moved to the direction of enlarging the pilot chamber 41 against the biasing force of the spring 42, and the small diameter portion 73 is brought into contact with the plug 62b. The first annular groove 74a reaches the upstream-side neutral port 60a, and the neutral passage 13 (see FIG. 1) is opened. At this time, the second annular groove 74b reaches the supply port 60c, and the flow of the working oil from the upstream-side neutral port 60a to the supply port 60c is allowed.

The spool body 71 of the switching valve 40 is formed with a spool passage 75 corresponding to a part of the pilot passage 43 illustrated in FIG. 1. The spool passage 75 is formed by a hole 75a opened in the bottom surface of the second annular groove 74b, a dent portion 75b formed on one of end surfaces of the spool body 71, and a hole 75c formed in a shaft core of the spool body 71 across the hole 75a and the dent portion 75b. Since the hole 75a is opened in the bottom surface of the second annular groove 74b, the spool passage 75 communicates with the upstream-side neutral port 60a regardless of the position of the spool 70.

Figure 3:
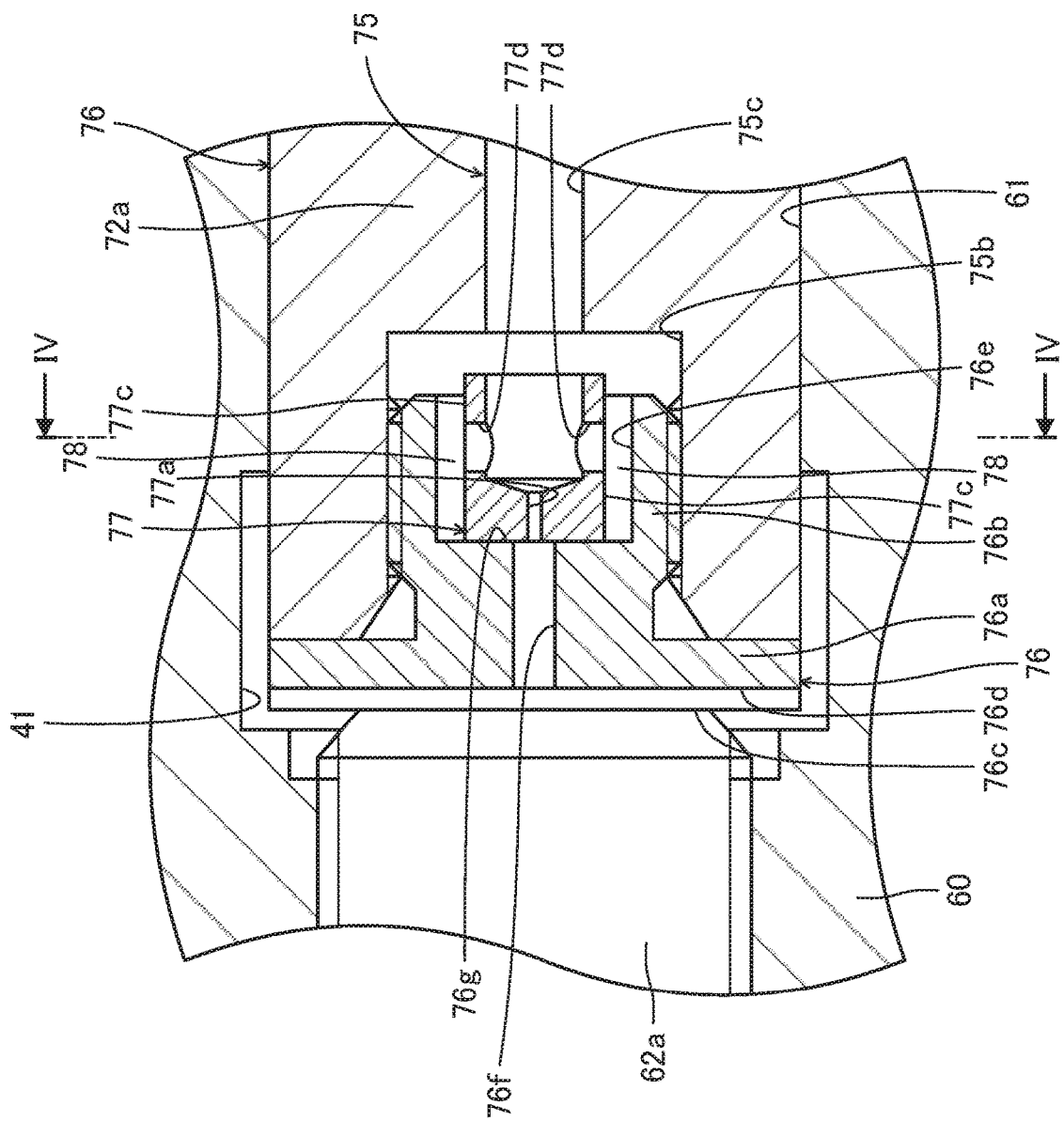
FIG. 3 is a partially enlarged sectional view of the switching valve.

FIG. 3 is an enlarged sectional view illustrating a periphery of the dent portion 75b of the spool body 71. As illustrated in FIG. 3, the plug 76 has a lid portion 76a that covers an opening of the dent portion 75b and a shaft portion 76b screwed with the inner peripheral surface of the dent portion 75b. The lid portion 76a has a facing surface 76c faced with the plug 62a, and the facing surface 76c is formed with a mounting minus groove 76d extending in the radial direction. The distal end surface of the shaft portion 76b is formed with a hole portion 76e having a circular section.

The plug 76A is formed with a hole 76f opened in the facing surface 76c and communicating with the hole portion 76e and corresponding to a part of the pilot passage 43. The pilot chamber 41 communicates with the spool passage 75 through the hole 76f. As illustrated in FIG. 2, since the spool passage 75 communicates with the upstream-side neutral port 60a, the pilot chamber 41 communicates with the upstream-side neutral port 60a through the hole 76f and the spool passage 75. That is, the pilot passage 43 is formed by the hole 76f and the spool passage 75, and the upstream-side neutral port 60a and the pilot chamber 41 communicate with each other through the pilot passage 43 (the hole 76f and the spool passage 75).

A valve body 77 is slidably accommodated in the hole portion 76e of the plug 76. The valve body 77 is formed having a bottomed cylindrical shape, a bottom portion of the valve body 77 is faced with a bottom surface of the hole portion 76e of the plug 76, and an opening end is faced with the bottom surface of the dent portion 75b of the spool body 71. The valve body 77 is formed with a throttle hole 77a penetrating the bottom portion in the axial direction.

Figure 4:
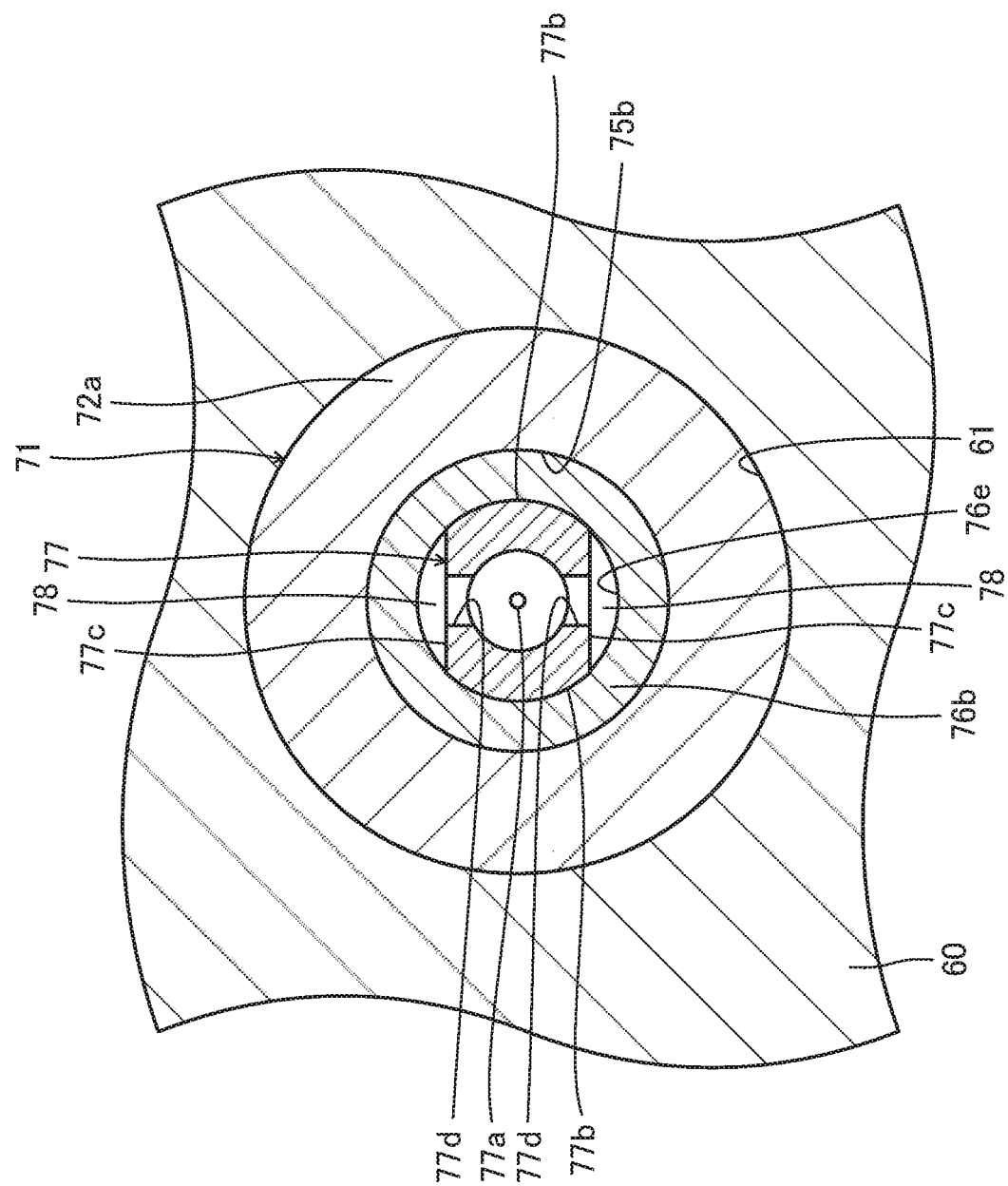
FIG. 4 is a sectional view along a IV-IV line illustrated in FIG. 3.

As illustrated in FIG. 4, an outer shape of the valve body 77 is formed having a substantially oval shape. Specifically, the outer peripheral surface of the valve body 77 has two plane portions 77c connecting two curved surface portions 77b to each other.

The valve body 77 is slidably supported by the inner peripheral surface of the hole portion 76e. Moreover, when the valve body 77 receives a force toward the bottom surface of the hole portion 76e, the valve body 77 is seated on the bottom surface of the hole portion 76e. That is, the bottom surface of the plug 76 is functions as a valve seat 76g formed in the spool passage 75 and on which the valve body 77 is seated and leaves.

The plane portion 77c of the valve body 77 is separated from the inner peripheral surface of the hole portion 76e of the plug 76, and a passage 78 is formed by the plane portion 77c and the inner peripheral surface of the hole portion 76e. The valve body 77 is formed with a hole 77d penetrating between the inner peripheral surface of the valve body 77 and the plane portion 77c.

When the working oil flows from the spool passage 75 toward the pilot chamber 41, as illustrated in FIG. 3, the valve body 77 is seated on the valve seat 76g of the plug 76 by the pressure of the working oil. Thus, the flow of the working oil that is led to the hole 76f from the hole 75c of the spool passage 75 through the hole 77d and the passage 78 is shut off. Therefore, the flow of the working oil that is led from the spool passage 75 to the pilot chamber 41 is throttled by the throttle hole 77a.

When the working oil flows from the pilot chamber 41 toward the spool passage 75, the valve body 77 leaves the valve seat 76g of the plug 76 by the pressure of the working oil, and the distal end of the valve body 77 is brought into contact with the bottom surface of the dent portion 75b. Thus, the flow of the working oil in a space between the bottom portion of the valve body 77 and the valve seat 76g of the plug 76 is allowed. Therefore, the working oil in the pilot chamber 41 flows into the hole 75c of the spool passage 75 through the passage 78 and the hole 77d. That is, the flow of the working oil that is led from the pilot chamber 41 to the spool passage 75 is not throttled by the throttle hole 77a.

As described above, the bypass passage 45 (see FIG. 1) is formed by the hole 77d, the passage 78, and the space between the bottom portion of the valve body 77 and the valve seat 76g of the plug 76.

As described above, when the working oil is discharged from the pilot chamber 41, the valve body 77 leaves the valve seat 76g of the plug 76, and when the working oil is supplied to the pilot chamber 41, the valve body 77 is seated on the valve seat 76g of the plug 76 and throttles the flow of the working oil in the spool passage 75. In other words, the check valve 46 illustrated in FIG. 1 is formed by the valve seat 76g provided in the spool passage 75 and the valve body 77 accommodated in the spool passage 75, and the throttle hole 77a of the valve body 77 functions as the throttle portion 44 (see FIG. 1).

Since the valve body 77 of the check valve 46 (see FIG. 1) is accommodated in the spool passage 75, and the throttle hole 77a serving as the throttle portion 44 (see FIG. 1) is formed in the valve body 77, the throttle portion 44 and the check valve 46 are accommodated in the housing 60 together with the spool 70. Therefore, the throttle portion 44 and the check valve 46 can be assembled in the housing 60 by assembling the spool 70 in the housing 60, and the fluid pressure control device 100 (see FIG. 1) can be manufactured easily.

Moreover, since the valve body 77 is provided between the spool body 71 and the plug 76, the valve body 77 can be replaced only by removing the plug 76. Since the valve body 77 functions as the check valve 46 and the throttle hole 77a of the valve body 77 functions as the throttle portion 44, the throttle portion 44 and the check valve 46 can be replaced by replacing the valve body 77. Therefore, the throttle portion 44 and the check valve 46 can be replaced without replacing the entire spool 70.

Subsequently, a fluid pressure control device 200 according to a variation of this embodiment and a switching valve 240 will be described by referring to FIGS. 5 and 6.

Figure 5:
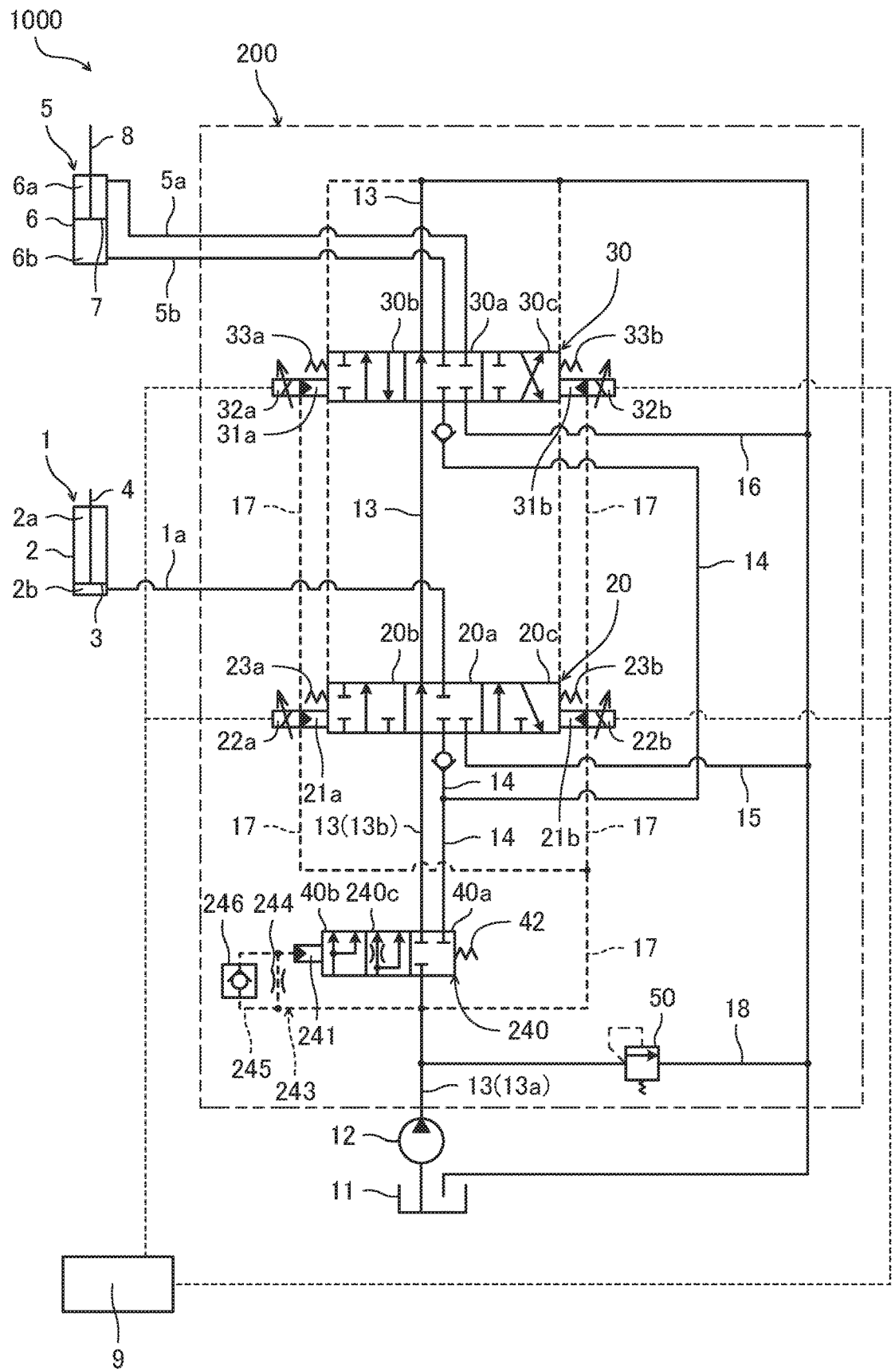
FIG. 5 is a circuit diagram of the fluid pressure control device according to a variation of the embodiment of the present invention.

As illustrated in FIG. 5, in the fluid pressure control device 200, when switched to a throttle position 240c, the switching valve 240 allows the flow of the working oil from the pump 12 to the supply passage 14. Thus, even in a state where the pressure in a pilot chamber 241 does not sufficiently rise only with the load of the lift cylinder 1 or the tilt cylinder 5, and the switching valve 240 is held at the throttle position 240c, the working oil is supplied from the pump 12 to the supply passage 14. Therefore, the working oil can be continuously supplied to the lift cylinder 1 or the tilt cylinder 5, and the operation of the lift cylinder 1 or the tilt cylinder 5 can be made stable.

Figure 6:
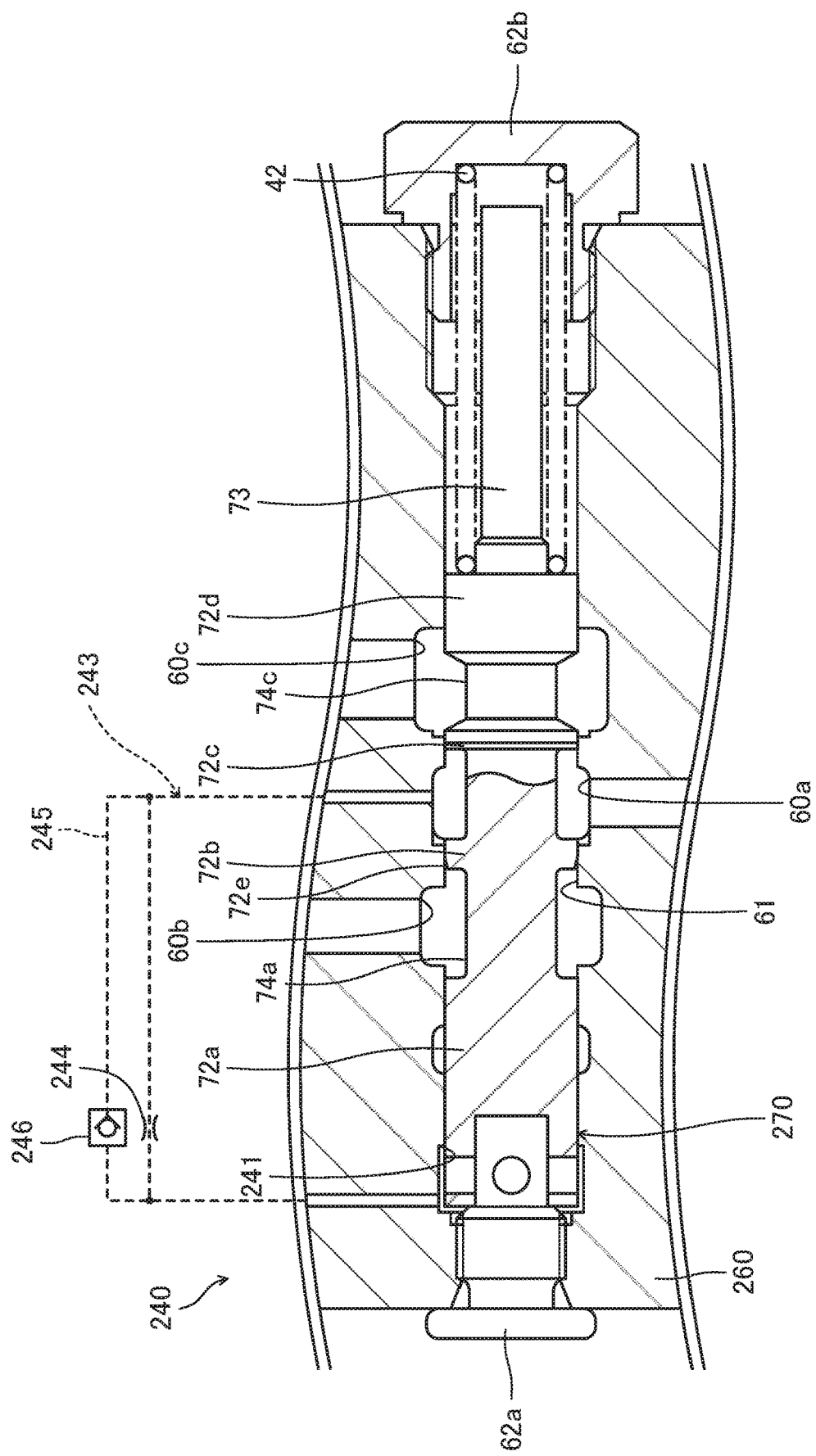
FIG. 6 is a sectional view of the switching valve according to the variation.

As illustrated in FIG. 6, in the switching valve 240, a pilot passage 243 including a bypass passage 245 is formed in a housing 260, and a throttle portion 244 and a check valve 246 are provided in the housing 260. In this case, the throttle portion 244 and the check valve 246 can be replaced without removing a spool 270 from the housing 260.

Moreover, the throttle portion 244 does not have to be formed integrally with the check valve 246. For example, the throttle portion 244 may be formed of an orifice plug fixed to the housing 260, and a valve body of the check valve 246 may be provided in the housing 260 separately from the orifice plug.

Hereinafter, the constitution, actions and effects of the embodiment of the present invention will be described in brief.

The fluid pressure control device 100, 200 includes the neutral passage 13 connecting the pump 12 and the tank 11, the first control valve 20 provided in the neutral passage 13 and configured to control the operation of the lift cylinder 1 by being operated by the working oil led to the pair of pilot chambers 21a and 21b, the second control valve 30 provided on the downstream side of the first control valve 20 in the neutral passage 13 and configured to control the operation of the tilt cylinder 5, the switching valve 40, 240 provided on the upstream side of the first control valve 20 and the second control valve 30 in the neutral passage 13 and having the positions switched by the working oil led to the pilot chamber 41, 241, the pilot passage 17 connected to the upstream side of the switching valve 40, 240 in the neutral passage 13 and configured to lead the working oil in the neutral passage 13 to the pair of pilot chambers 21a and 21b, and the pilot passage 43, 243 connected to the upstream side of the switching valve 40, 240 in the neutral passage 13 and configured to lead the working oil in the neutral passage 13 to the pilot chamber 41, 241, the first control valve 20 has the neutral position 20a where supply/discharge of the working oil to/from the lift cylinder 1 is shut off and the neutral passage 13 is opened, the supply position 20b switched from the neutral position 20a by a pressure in one of the pilot chambers 21a and where the neutral passage 13 is shut off, and the working oil that is discharged from the pump 12 is led to the lift cylinder 1, and the discharge position 20c switched from the neutral position 20a by the pressure in the other pilot chamber 21b and where the neutral passage 13 is opened, and the working oil is led from the lift cylinder 1 to the tank 11, the second control valve 30 has the neutral position 30a where the supply/discharge of the working oil to/from the tilt cylinder 5 is shut off, and the neutral passage 13 is opened and the operation positions 30b and 30c where the neutral passage 13 is shut off, and the working oil that is discharged from the pump 12 is led to the tilt cylinder 5, and the switching valve 40, 240 has the open position 40b where the neutral passage 13 is opened and the throttle position 40c, 240c where the flow of the working oil in the neutral passage 13 is throttled, and is configured to be switched to the open position 40b when the working oil is supplied to the pilot chamber 41, 241 from the neutral passage 13 through the pilot passage 43, 243 with the shut-off on the downstream side of the switching valve 40, 240 in the neutral passage 13 and the pressure in the pilot chamber 41, 241 rises, and to be switched to the throttle position 40c, 240c with the open on the downstream side of the switching valve 40, 240 in the neutral passage 13, the pilot passage 43, 243 is provided with the throttle portion 44, 244 configured to throttle the flow of the working oil and the check valve 46, 246 that is in parallel with the throttle portion 44, 244 and that is configured to shut off the flow of the working oil supplied to the pilot chamber 41, 241, and to allow the flow of the working oil discharged from the pilot chamber 41 241.

In this constitution, when the downstream side of the switching valve 40, 240 in the neutral passage 13 is opened, and the pressure in the neutral passage 13 lowers, the switching valve 40, 240 are switched to the throttle position 40c, 240c. As a result, the working oil in the pilot chamber 41, 241 is discharged to the neutral passage 13 through the check valve 46, 246. Therefore, when the second control valve 30 is switched to the neutral position 30a in a state where the first control valve 20 is switched to the discharge position 20c, and the second control valve 30 is switched to the operation positions 30b and 30c, the flow of the working oil in the neutral passage 13 can be throttled by the switching valve 40, 240 having been switched to the throttle position 40c, 240c, whereby lowering of the pressure in the pilot passage 17 can be prevented. As a result, unintentional switching of the first control valve 20 can be prevented, and stability in the operation of the fluid pressure control device 100, 200 can be improved.

Moreover, in the fluid pressure control device 100, 200, the second control valve 30 has the pair of pilot chambers 31a and 31b connected to the pilot passage 17 and is configured to be operated by the working oil led to the pair of pilot chambers 31a and 31b through the pilot passage 17.

In this constitution, the first control valve 20 and the second control valve 30 can be driven by the same pressure in the neutral passage 13 without controlling the both with separate pressures. Therefore, the stability in the operation of the fluid pressure control device 100, 200 is improved, while the fluid pressure control device 100, 200 can be simplified.

Moreover, the fluid pressure control device 200 further has the supply passage 14 connected to the lift cylinder 1 through the first control valve 20 and configured to supply the working oil from the pump 12 to the lift cylinder 1 in accordance with switching of the first control valve 20, and the switching valve 240 is configured to allow the flow of the working oil to the supply passage 14 from the pump 12 when switched to the throttle position 240c.

In this constitution, the switching valve 240 is configured to allow the flow of the working oil to the supply passage 14 from the pump 12 when switched to the throttle position 240c. Thus, even in the state where the switching valve 240 is held at the throttle position 240c, the working oil is supplied to the supply passage 14 from the pump 12. Therefore, the working oil can be supplied to the lift cylinder 1 both in a state where the switching valve 240 is at the throttle position 240c and in a state at the open position 40b, whereby the operation of the lift cylinder 1 can be made stable.

Moreover, in the fluid pressure control device 100, the switching valve 40 has a housing 60 formed with the upstream-side neutral port 60a connected to the upstream-side neutral passage 13a as well as the downstream-side neutral port 60b connected to the downstream-side neutral passage 13b in the neutral passage 13 and the pilot chamber 41 and the spool 70 slidably accommodated in the housing 60 by facing the pilot chamber 41 and configured to open the neutral passage 13 by movement to the direction of enlarging the pilot chamber 41 and to throttle the flow of the working oil in the neutral passage 13 by the movement to the direction of reducing the pilot chamber 41, the pilot passage 43 has the spool passage 75 formed in the spool 70, the check valve 46 has the valve seat 76g provided in the spool passage 75 and the valve body 77 accommodated in the spool passage 75 and configured to be seated on/leaving the valve seat 76g by moving in accordance with the flow of the working oil in the pilot passage 43, and the throttle portion 44 is formed on the valve body 77.

In this constitution, since the valve body 77 of the check valve 46 is accommodated in the spool passage 75, and the throttle portion 44 is formed on the valve body 77, the throttle portion 44 and the check valve 46 are accommodated in the housing 60 together with the spool 70. Therefore, the throttle portion 44 and the check valve 46 can be assembled in the housing 60 by assembling the spool 70 in the housing 60, and the fluid pressure control device 100 can be manufactured easily.

Although the embodiment of the present invention has been described above, the above embodiment is merely an illustration of one exemplary application of the present invention and is not intended to limit the technical scope of the present invention to the specific configuration of the above embodiment.

The fluid pressure control device 100, 200 according to the aforementioned embodiment use the working oil as the working fluid, but a non-compressive fluid such as water, an aqueous solution and the like may be used instead of the working oil.

In the fluid pressure control device 100, 200, it is described that the second control valve 30 controls the operation of the tilt cylinder 5, but it may be formed so as to control an operation of an actuator serving as the second actuator separate from the tilt cylinder 5.

In the fluid pressure control device 100, 200, the second control valve 30 is provided on the downstream side of the first control valve 20 in the neutral passage 13 but it may be provided between the switching valve 40, 240 and the first control valve 20 in the neutral passage 13. In this case, lowering of the pressure when the first control valve 20 is returned to the neutral position 20a can be prevented in a state where the second control valve 30 is switched to the operation positions 30b and 30c and the first control valve 20 is switched to the supply position 20b.

The present application claims a priority based on Japanese Patent Application No. 2018-3773 filed with the Japan Patent Office on Jan. 12, 2018, and all the contents of this application are incorporated herein by reference.

The invention claimed is:

1. A fluid pressure control device, comprising:
    a neutral passage connecting a pump and a tank;
    a first control valve provided in the neutral passage and configured to control an operation of a first actuator by being operated by a working fluid led to a pair of first pilot chambers;
    a second control valve provided in the neutral passage and configured to control an operation of a second actuator;
    a switching valve provided on an upstream side of the first control valve and the second control valve in the neutral passage, the switching valve having positions switched by the working fluid led to a switching valve pilot chamber;
    a main pilot passage connected to an upstream side of the switching valve in the neutral passage, the main pilot passage being configured to lead the working fluid in the neutral passage to the pair of first pilot chambers; and
    a sub pilot passage connected to the upstream side of the switching valve in the neutral passage, the sub pilot passage being configured to lead the working fluid in the neutral passage to the switching valve pilot chamber, wherein
    the first control valve has:
        a first neutral position where supply of the working fluid to the first actuator and discharge of the working fluid from the first actuator are shut off and the neutral passage is opened;
        a supply position switched from the first neutral position by a pressure in one of the pair of first pilot chambers and where the neutral passage is shut off and the working fluid discharged from the pump is led to the first actuator; and
        a discharge position switched from the first neutral position by a pressure in the other of the pair of first pilot chambers and where the neutral passage is opened and the working fluid is led to the tank from the first actuator;
    the second control valve has:
        a second neutral position where the supply of the working fluid to the second actuator and discharge of the working fluid from the second actuator are shut off and the neutral passage is opened; and
        an operation position where the neutral passage is shut off and the working fluid discharged from the pump is led to the second actuator;
    the switching valve has an open position where the neutral passage is opened and a throttled position where a flow of the working fluid in the neutral passage is throttled, the switching valve being configured to be switched to the open position when the working fluid is supplied to the switching valve pilot chamber from the neutral passage through the sub pilot passage with the shut-off on a downstream side of the switching valve in the neutral passage, and to be switched to the throttled position with opening on the downstream side of the switching valve in the neutral passage; and
    the sub pilot passage is provided with a throttle portion configured to throttle the flow of the working fluid and a check valve in parallel in the throttle portion, the check valve being configured to shut off the flow of the working fluid supplied to the switching valve pilot chamber and to allow the flow of the working fluid discharged from the switching valve pilot chamber.

2. The fluid pressure control device according to claim 1, wherein
    the second control valve has a pair of second pilot chambers connected to the main pilot passage, the second control valve being configured to be operated by the working fluid led to the pair of second pilot chambers through the main pilot passage.

3. The fluid pressure control device according to claim 1, further comprising:
    a supply passage connected to the first actuator through the first control valve, the supply passage being configured to supply the working fluid to the first actuator from the pump in accordance with switching of the first control valve, wherein
    the switching valve is configured to allow the flow of the working fluid to the supply passage from the pump when switched to the throttled position.

4. The fluid pressure control device according to claim 1, wherein
    the switching valve has:
        a housing formed with a neutral port connected to the neutral passage and the switching valve pilot chamber; and
        a spool slidably accommodated in the housing by facing the switching valve pilot chamber, the spool being configured to open the neutral passage by movement in a direction where the switching valve pilot chamber is enlarged and to throttle the flow of the working fluid in the neutral passage by the movement in a direction where the switching valve pilot chamber is reduced;
    the sub-pilot passage has a spool passage formed in the spool;
    the check valve has:
        a valve seat provided in the spool passage; and
        a valve body accommodated in the spool passage and configured to be seated or leave the valve seat by moving in accordance with the flow of the working fluid in the sub-pilot passage; and
    the throttle portion is formed on the valve body.

* * * * *